Patented May 6, 1924.

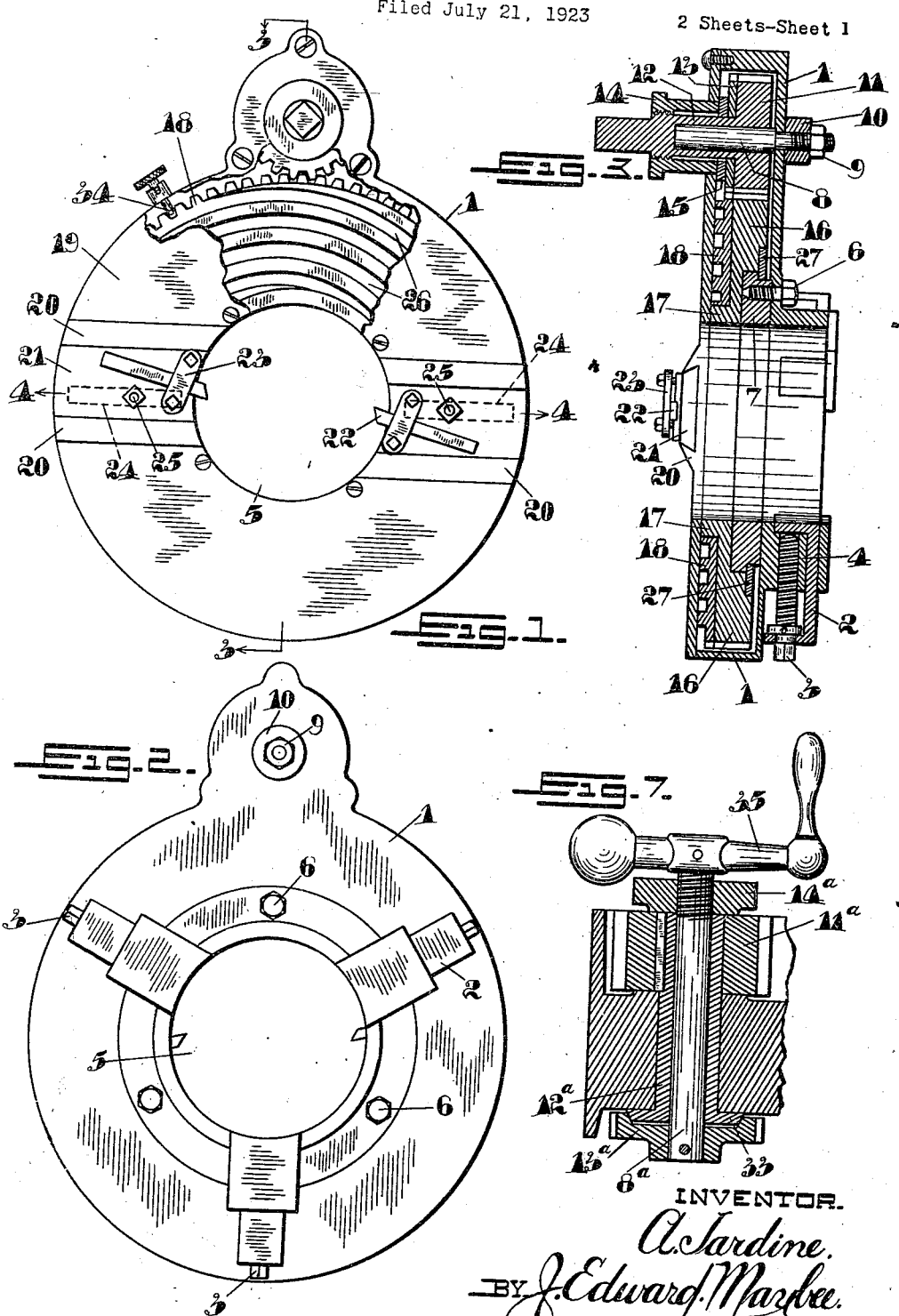

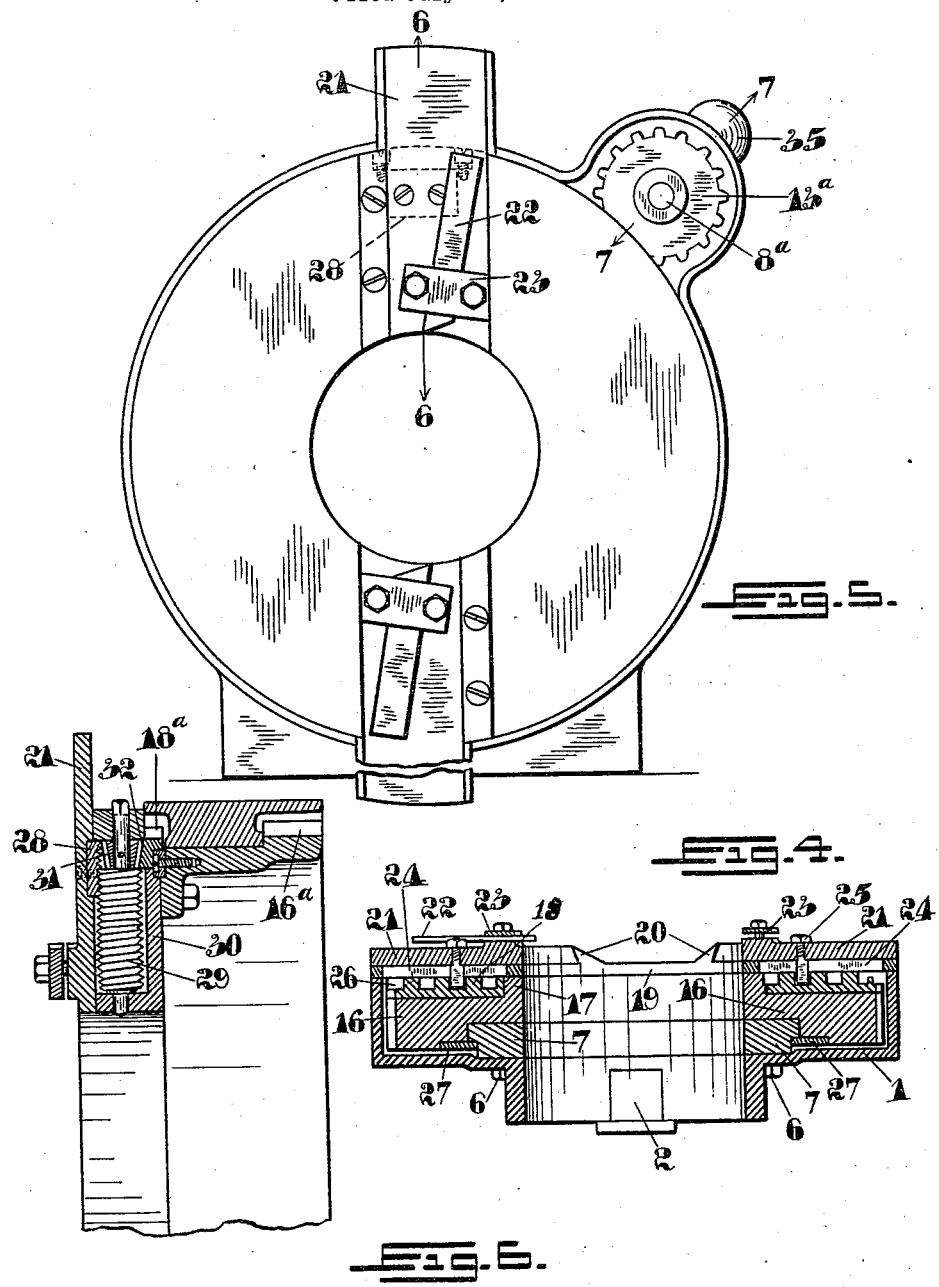

1,493,452

UNITED STATES PATENT OFFICE.

ANDREW JARDINE, OF HESPELER, ONTARIO, CANADA.

PIPE CUTTER.

Application filed July 21, 1923. Serial No. 652,963.

*To all whom it may concern:*

Be it known that I, ANDREW JARDINE, of Hespeler, in the county of Waterloo, Province of Ontario, Canada, a subject of the King of Great Britain, have invented certain new and useful Improvements in Pipe Cutters, of which the following is a specification.

This invention relates to pipe cutters of the type which are clamped on to the pipe just back of the point at which the pipe is to be cut, the pipe being held in a vise or other suitable clamping device. The cutters are rotated about the pipe to cut the same, but heretofore it has been necessary to depend on the operator to feed forward the cutters by hand with the result that there is no regularity of feed of the cutters and often one cutter is fed forward faster than the other.

The object of my invention is therefore to devise a pipe cutter in which the cutter will be fed forward automatically as the cutters are rotated, thus ensuring regularity of feed of the cutter relative to the rate of rotation of the cutters and also ensuring that the cutters will be fed at the same speed relative to one another.

A further object is to devise a cutter which is capable of cutting different sizes of pipe within predetermined limits, and in which the cutters may be quickly fed to the point at which cutting is to commence, and quickly retracted after cutting has been completed.

I attain my objects by means of the constructions hereinafter described and illustrated in the accompanying drawings in which—

Fig. 1 is a front elevation, partly broken away, of my improved device;

Fig. 2 a rear elevation of the same;

Fig. 3 a section taken on the line 3—3 in Fig. 1;

Fig. 4 a section taken on the line 4—4 in Fig. 1;

Fig. 5 a front elevation of a modified form of construction;

Fig. 6 a section on the line 6—6 in Fig. 5; and

Fig. 7 a section on the line 7—7 in Fig. 5.

Referring particularly to Figs. 1 to 4, 1 is a head, on the rear side of which are mounted in suitable guides the radially adjustable clamping members 2. These clamping members are actuated by means of screws 3 threaded into lugs 4 formed on or secured to the rear of the base 1 and forming part of the aforesaid guides. The head, it will be seen, is provided with a central opening 5 through which the end of the pipe is passed when the device is to be clamped on the pipe.

Surrounding the opening 5 and secured to the head 1 by means of cap screws 6 is the annular bearing 7.

Secured at one end to the head 1 is a pin 8. The end of the pin is of reduced diameter forming a shoulder which engages the forward side of the head. The portion of reduced diameter is passed through a hole in the head and has a nut 9 threaded on its outer end so that the head is firmly gripped between the nut 9 and the shoulder. Preferably a boss 10 is formed on the rear side of the head where the pin 8 passes through to provide increased support for the pin.

Rotatably mounted on the pin 8 is the pinion 11, which pinion is provided with a hub or shaft 12 at its forward side, preferably integral therewith. This hub adjacent the pinion 11, is formed as a bearing for the pinion 13 which is adapted to frictionally engage the side of the pinion 11. On the hub 12 is threaded the clamping nut 14 by means of which the pinion 13 may be clamped against the pinion 11 so as to be driven thereby. Preferably however, I interpose between the clamping nut and the pinion 13 the annular disk 15.

Rotatably mounted on the bearing 7 and meshing with the pinion 11 is the driving gear 16. I preferably form partly in the bearing 7 and partly on the gear 16 a groove in which is received a ring 27 to assist in retaining the gear in position on the bearing. This gear 16 is provided with an annular rib 17, which serves as a bearing on which a feed gear 18 may rotate. This gear 18 meshes with the pinion 13.

Mounted in the head is the plunger 34, the point of which is adapted to be engaged with the teeth of the gear 18, but is normally held out of such engagement by means of a suitable spring.

Secured to the rib 17 by means of suitable screws is the cutter carrier 19, on which carrier are formed guides 20 in which the slides 21 are movable to and from the work.

Each cutter 22 is secured to its slide by a retainer or clamp 23, secured to the slide by means of cap screws. In the carrier 19 below each slide 21 is formed a slot 24. Secured to each slide and extending through its corresponding slot 24 is a pin 25, the end of which extends into a spiral groove 26 formed in the side of the feed gear 18.

The pinion 11 and gear 16 and the pinion 13 and gear 18 are so proportioned that the gear 18 will be driven slightly faster or slower than the gear 16.

The method of operation of the construction hereinbefore set forth is substantially as follows: When a piece of pipe is to be cut, the device is clamped on the pipe by means of the clamping members 2. As it is desirable to feed the cutters forward to the cutting position as rapidly as possible, the clamping nut 14 is loosened to release the frictional engagement of the pinion 13 with the pinion 11 and the plunger 34 is engaged with the teeth of the feed gear 18 to hold the latter stationary. The handle is then turned and through the pinion 11, the gear 16 is rotated. As the carrier 19, which carries the slides and cutters, is secured to the gear 16, the cutters are rotated about the pipe, and, therefore, through the engagement of the pins 25 in the spiral groove 26, the slides, and therefore the cutters, are rapidly fed forward into position ready to cut the pipe.

In order to cut properly, however, it is necessary that the rate of feed be regulated relative to the rate of rotation. The clamping nut 14 is therefore tightened up to frictionally engage the disk 15, the pinion 13 and the pinion 11 with one another so that they will all rotate together. The handle is again turned and through the pinions 13 and 11, the gears 18 and 16 are both rotated. Owing to the proportioning of the pinion 11 and gear 16 and the pinion 13 and gear 18, the gear 18 will be rotated very slightly faster or slower than the gear 16 and the feed of the cutters will therefore be considerably slower than when moving the cutters into cutting position.

To retract the slides and cutters it is merely necessary to operate the handle to actuate the hub or shaft 12 in the reverse direction, but to secure speed of retraction, it is preferable to unscrew the clamping nut 14 to release the frictional engagement of the pinion 13 with the pinion 11 and engage the plunger 34 with the feed gear 18.

In Figs. 5, 6 and 7, I illustrate a modification of the cutter feeding means. In this construction each knife support is fed forward as follows: On the back surface of the slide is located a threaded member 28 with which is adapted to mesh a screw 29 journalled in a frame 30 carried by the driving gear $16^a$. At one end of this screw is mounted so as to rotate therewith a bevel pinion 31 which meshes with a bevel gear 32 formed on the side of the feed gear $18^a$.

The means for operating the gears $16^a$ and $18^a$ is also arranged differently. The hub $12^a$ is arranged as a separate part journalled intermediate its ends in the head 1. This hub is provided with a passage therethrough in which is inserted the shaft $8^a$. The hub at one end is provided with an enlargement 33. Secured to the shaft $8^a$ at one end is the pinion $13^a$, while keyed on the hub at the other end of the shaft is the pinion $11^a$. The shaft adjacent the pinion $11^a$ is threaded and on this threaded portion is screwed a clamping nut $14^a$.

The handle 35 is then actuated to rotate the shaft $8^a$. The clamping nut 14 is in the retracted position and therefore the pinion $11^a$ and the gear $16^a$ are idling. The pinion $13^a$, being secured to the shaft and positively driven thereby, the feed gear $18^a$ is driven to actuate the pinion 31 and screw 30, the latter through the threaded member 28 moving the slide 21 and cutter to the cutting position.

The nut 14 is then tightened up to frictionally engage the pinion $13^a$ with the enlargement 33 on the hub $12^a$, the nut bearing against the end of the hub. The pinion $11^a$ thus rotates the gear $16^a$ and the cutters are therefore rotated about the pipe as they are fed forward into the pipe.

As in my preferred construction, all that is necessary to retract the cutters is to operate the handle 35 in the reverse direction, but it is preferable to first release the frictional engagement between the pinion $13^a$, and the enlargement on the hub $12^a$ by loosening the clamping nut 14.

From the above description it will be seen that I have devised constructions which will satisfactorily attain the object of my invention as set out in the preamble of this specification.

What I claim as my invention is:—

1. In a pipe cutter, the combination of a head adapted to be clamped on a pipe and having an opening through which the pipe may pass; an annular driving member rotatably mounted in the head concentrically with said opening; a feed member rotatable relative to the driving member, said feed member having formed in the side thereof a spiral groove having a plurality of convolutions; a cutter support adapted to be rotated about the pipe by said driving member; and a pin on the cutter support extending into the spiral groove.

2. In a pipe cutter, the combination of a head adapted to be clamped on a pipe and having an opening through which the pipe may pass; a cutter driving gear rotatably mounted on the head; a cutter feed gear rotatable in the head; a cutter mounted to slide to and from said opening and rotatable about said opening by the driving gear; means whereby the feed gear effects the sliding movement of the cutter; common means for actuating the two gears; and means for freeing one of the said gears from its driving connection with the actuating means at will.

3. In a pipe cutter, the combination of a head adapted to be clamped on a pipe and having an opening through which the pipe may pass; a cutter driving gear rotatably mounted on the head; a cutter feed gear rotatable in the head; a cutter mounted to slide to and from said opening and rotatable about said opening by the driving gear; means whereby the feed gear effects the sliding movement of the cutter; an actuating shaft; a pinion fast on the shaft meshing with one of said gears; a second pinion rotatable on the shaft meshing with the other of said gears; and means for giving the rotatable pinion a driving connection with the fast pinion.

4. In a pipe cutter, the combination of a head adapted to be clamped on a pipe and having an opening through which the pipe may pass; an annular gear rotatably mounted in the head concentrically with said opening; a cutter carrier rotatable with said gear; a cutter support slidable on said carrier to and from said opening; actuating means for said gear; and means actuable by the actuating means for moving the cutter support to and from the work.

5. In a pipe cutter, the combination of a head adapted to be clamped on a pipe and having an opening through which the pipe may pass; a cutter driving gear rotatably mounted on the head; a cutter feed gear rotatable in the head; a cutter carrier rotatable with the driving gear; a cutter support slidable on said carrier to and from said opening; means whereby the feed gear effects the sliding movement of the cutter; common means for actuating the two gears; and means for freeing one of the said gears from its driving connection with the actuating means at will.

6. In a pipe cutter, the combination of a head adapted to be clamped on a pipe and having an opening through which the pipe may pass; a cutter driving gear rotatably mounted on the head; a cutter feed gear rotatable in the head; a cutter-carrier rotatable with the driving gear; a cutter support slidable on said carrier to and from said opening; means whereby the feed gear effects the sliding movement of the cutter; an actuating shaft; a pinion fast on the shaft meshing with one of said gears; a second pinion rotatable on the shaft meshing with the other of said gears; and means for giving the rotatable pinion a driving connection with the fast pinion.

7. In a pipe cutter, the combination of a head adapted to be clamped on a pipe and having an opening through which the pipe may pass; a plurality of cutter supports mounted to slide to and from said opening and also rotatable about said opening; an actuating shaft; and differential gearing actuable by said shaft to rotate the cutter supports about the opening and to feed them at a relatively slow rate towards the work, said differential gearing including a member having formed in the side thereof a spiral groove having a plurality of convolutions; and a pin on each cutter support extending into the spiral groove.

8. In a pipe cutter, the combination of a head adapted to be clamped on a pipe and having an opening through which the pipe may pass; a cutter mounted to slide to and from said opening; and also rotatable about said opening; an actuating shaft; differential gearing actuable by said shaft to rotate the cutter about the opening and to feed it at a relatively slow rate towards its work; and means for disconnecting a portion of the differential gearing to vary the rate of movement of the cutter to and from the opening.

9. In a pipe cutter, the combination of a head adapted to be clamped on a pipe and having an opening through which a pipe may pass; a driving gear rotatably mounted on said head about the opening; a cutter carrier rotatable with said gear; a feed gear having a spiral groove in the side thereof and rotatable relative to the driving gear; a cutter support slidable radially of the carrier; a pinion adapted to drive the driving gear; a pinion adapted to drive the feed gear; means for simultaneously driving said pinions, said pinions and gears being proportioned so that the gears will rotate at different speeds relative to one another; and a pin on the cutter support extending into the spiral groove.

10. In a pipe cutter, the combination of a head adapted to be clamped on a pipe and having an opening through which a pipe may pass; a driving gear rotatably mounted on said head about the opening; a cutter carrier rotatable with said gear; a feed gear having a spiral groove in the side thereof and rotatable relative to the driving gear; a cutter support slidable radially of the carrier; a pinion adapted to drive the driving gear; a hub on one side of said pinion; a pinion rotatable on said hub and adapted to drive the feed gear; means for frictionally engaging said pinions with one another, said pinions and gears being proportioned so that the gears will rotate at different speeds relative to one another; and a pin on the cutter support extending into the spiral groove.

11. In a pipe cutter, the combination of a head adapted to be clamped on a pipe and having an opening through which a pipe may pass; a driving gear rotatably mounted on said head about the opening, said gear having an annular rib thereon; a cutter carrier rotatable with said gear; a feed gear rotatably mounted on said rib and having a spiral groove in the side thereof and rotatable relative to the driving gear; a cutter support slidable radially of the carrier; a shaft; a pinion rotatable with the shaft to drive the driving gear; a pinion on said shaft and rotatable relative thereto adapted to drive the feed gear; means for frictionally engaging the last mentioned pinion with the first mentioned pinion; means for preventing the rotation of the feed gear when the pinions are out of frictional engagement with one another; said pinions and gears being proportioned so that the gears will rotate at different speeds relative to one another; and a pin on the cutter support extending into the spiral groove.

12. In a pipe cutter, the combination of a head adapted to be clamped on a pipe and having an opening through which the pipe may pass; a cutter driving gear rotatably mounted on the head; a cutter feed gear rotatable in the head, said cutter feed gear having formed in the side thereof a spiral groove having a plurality of convolutions; a cutter carrier mounted to slide to and from said opening and rotatable about said opening by the driving gear; a pin on the cutter carrier extending into said groove; common means for actuating the two gears; and means for freeing the cutter driving gear from its driving connection with the actuating means at will.

13. In a pipe cutter, the combination of a head adapted to be clamped on a pipe and having an opening through which the pipe may pass; an annular driving member rotatably mounted in the head concentrically with said opening; a feed member rotatable relative to the driving member, said feed member having formed in the side thereof a spiral groove having a plurality of convolutions; a plurality of cutter supports adapted to be rotated above the pipe by said driving member; and a pin on each cutter support extending into the spiral groove.

Signed at Toronto, Canada, this 26th day of June, 1923.

ANDREW JARDINE.